United States Patent
Czerwinka et al.

(10) Patent No.: US 11,834,079 B2
(45) Date of Patent: Dec. 5, 2023

(54) RAIL VEHICLE COMPRISING A BOGIE CLADDING

(71) Applicant: Siemens Mobility Austria GmbH, Vienna (AT)

(72) Inventors: Thomas Czerwinka, Weitendorf (AT); Manuel Alexander Gageik, Tonisvorst (DE); Andreas Grzona, Straelen (DE); Alexander Prix, Graz (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 781 days.

(21) Appl. No.: 16/955,273

(22) PCT Filed: Dec. 20, 2017

(86) PCT No.: PCT/EP2017/083791
§ 371 (c)(1),
(2) Date: Jun. 18, 2020

(87) PCT Pub. No.: WO2019/120510
PCT Pub. Date: Jun. 27, 2019

(65) Prior Publication Data
US 2020/0391769 A1    Dec. 17, 2020

(51) Int. Cl.
*B61D 17/02* (2006.01)
*B61F 5/52* (2006.01)
*B61F 3/14* (2006.01)
*B61F 5/02* (2006.01)

(52) U.S. Cl.
CPC .............. *B61D 17/02* (2013.01); *B61F 5/52* (2013.01); *B60L 2200/26* (2013.01); *B61F 3/14* (2013.01); *B61F 5/02* (2013.01)

(58) Field of Classification Search
CPC ... B61D 17/02; B61F 3/14; B61F 5/02; B61F 5/52; B60L 2200/26
See application file for complete search history.

(56) References Cited

FOREIGN PATENT DOCUMENTS

| CN | 101005978 | 7/2007 | |
|---|---|---|---|
| CN | 101624058 | 1/2010 | |
| DE | 726181 | 10/1942 | |
| DE | 726181 C * | 10/1942 | ............ B61D 17/02 |
| DE | 2542780 | 4/1977 | |
| DE | 102009006562 | 8/2010 | |
| DE | 102009006562 A1 * | 8/2010 | ............ B61D 17/02 |
| DE | 102010061718 | 5/2012 | |
| DE | 102016201154 | 7/2017 | |

(Continued)

OTHER PUBLICATIONS

Office Action dated Jan. 28, 2021 issued in Chinese Patent Application No. 201780097879.8.

(Continued)

*Primary Examiner* — Robert J McCarry, Jr.
(74) *Attorney, Agent, or Firm* — Cozen O'Connor

(57) ABSTRACT

A rail vehicle includes a bogie, a bogie cavity in which the bogie is embedded, and a bogie cladding via which the bogie is at least partially clad, where the bogie cladding includes an opening, and where the bogie includes a flow-inhibitor arranged at the opening to reduce the inflow of air through the opening into the bogie cavity in order to reduce the inflow of air through the opening into the bogie cavity in an economical manner.

22 Claims, 5 Drawing Sheets

(56) References Cited

FOREIGN PATENT DOCUMENTS

| EP | 2236323 | 10/2010 | | |
|---|---|---|---|---|
| EP | 2236323 A2 * | 10/2010 | ............ | B60D 5/003 |
| EP | 3222484 | 9/2017 | | |
| EP | 3222484 A1 * | 9/2017 | ............ | B61D 17/02 |
| JP | 46-93151 B2 | 6/2011 | | |
| WO | 2016010204 | 1/2016 | | |
| WO | WO-2016010204 A1 * | 1/2016 | ............ | B61D 17/02 |

OTHER PUBLICATIONS

PCT International Search Report dated Sep. 17, 2018 based on PCT/EP2017/083791 filed Dec. 20, 2017.

* cited by examiner

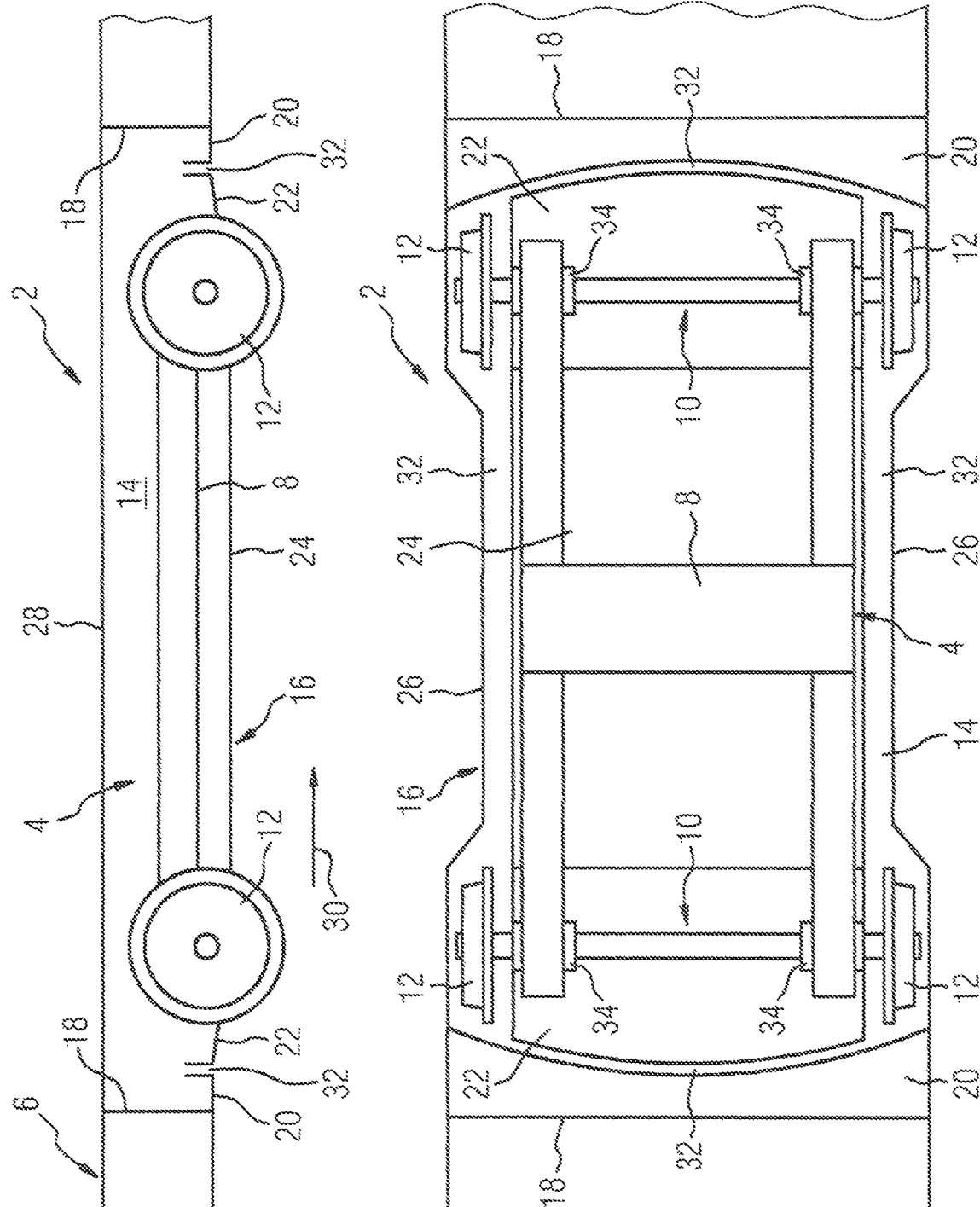

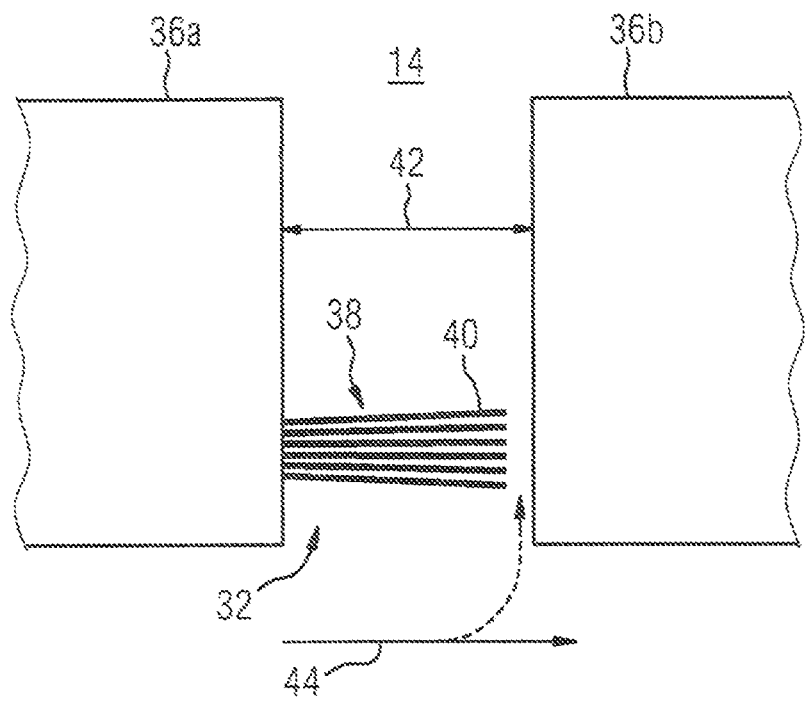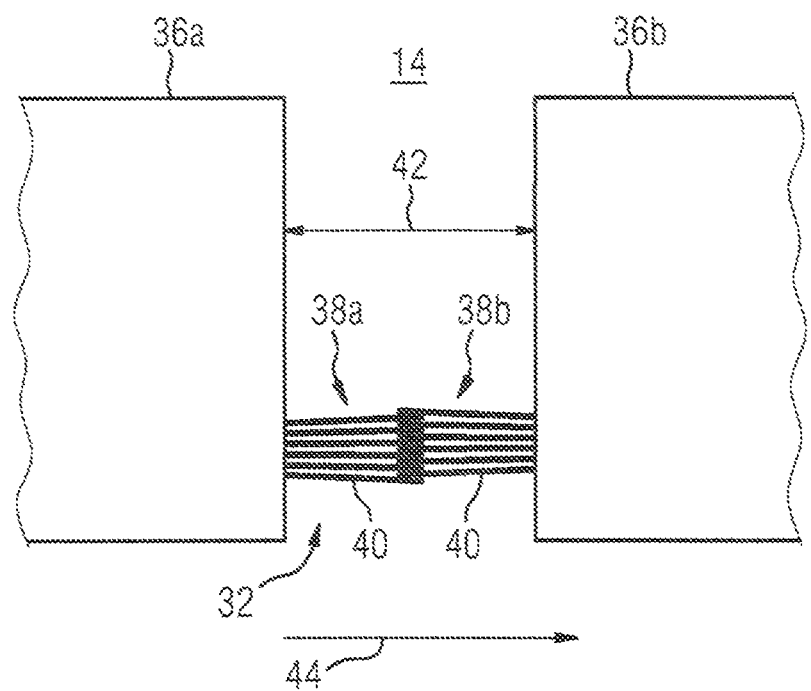

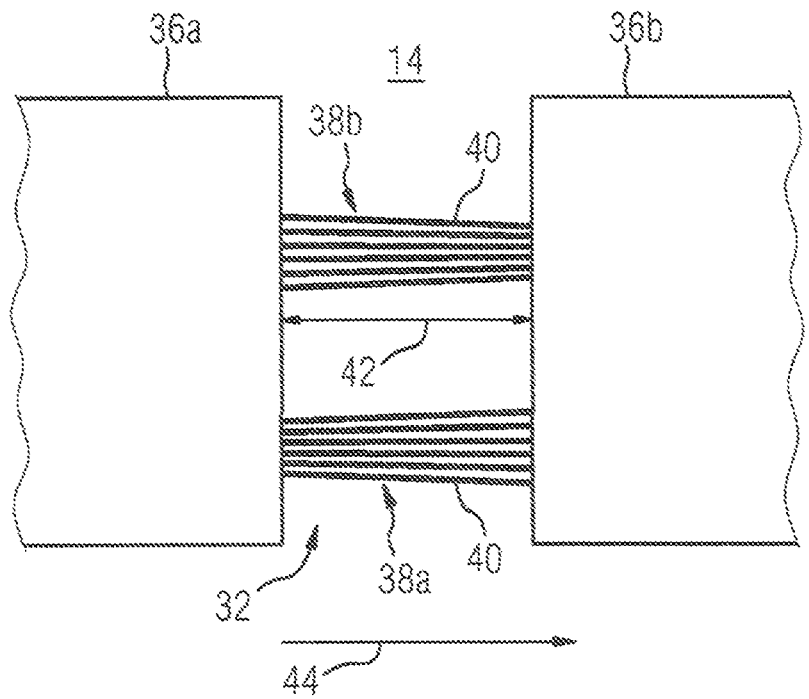
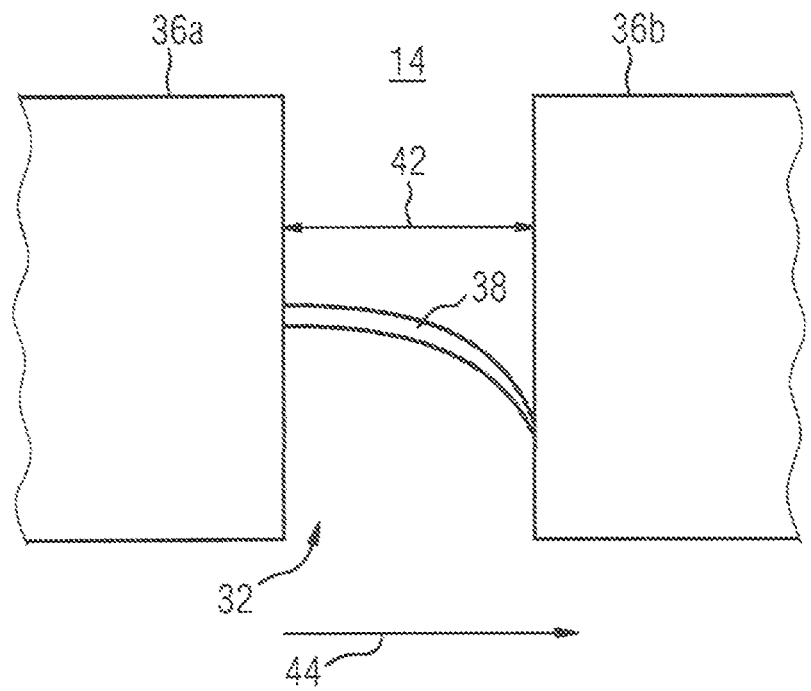

RAIL VEHICLE COMPRISING A BOGIE CLADDING

CROSS-REFERENCE TO RELATED APPLICATIONS

This is a U.S. national stage of application No. PCT/EP2017/083791 filed 20 Dec. 2017.

BACKGROUND OF THE INVENTION

1. Field of the Invention

The invention relates to a rail vehicle, comprising a bogie, a bogie cavity in which the bogie is embedded, a bogie cladding via which the bogie is at least partially clad, where the bogie cladding has an opening.

2. Description of the Related Art

In cases of a rail vehicle, particularly a rail vehicle used in high-speed traffic, it is known to clad a bogie of the rail vehicle via a bogie cladding to reduce the air resistance of the rail vehicle. The bogie cladding (partially) closes a bogie cavity of the rail vehicle, in which the bogie is embedded, and reduces a lossy inflow of outside air into the bogie cavity during the journey of the rail vehicle.

If the bogie cladding has an opening, then outside air can flow into the bogie cavity through the opening during the journey of the rail vehicle. Such an opening may, for example, be an assembly-related gap between two adjacent cladding elements of the bogie cladding or a movement gap allowing a relative movement between two cladding elements.

The inflow of outside air through such an opening into the bogie cavity not only has a detrimental effect on the air resistance of the rail vehicle, but because of the outside air can also result in particles of ballast, dirt and/or snow that may be deposited there being introduced into the bogie cavity. This leads to increased maintenance costs and may possibly lead to damage to the rail vehicle, in particular to the bogie.

DE 10 2016 201 154 A1 discloses blowing pressurized air into a bogie cavity with the aid of an air blowing device to prevent or at least reduce the inflow of outside air through an opening into the bogie cavity. This solution is relatively cost-intensive because it is structurally complex and (because air needs to be blown in continuously during the journey) is associated with a high expenditure of energy.

SUMMARY OF THE INVENTION

It is an object of the invention is to provide a rail vehicle with a structure that enables a reduction in the inflow of air through the opening into the bogie cavity in a rail vehicle of the type mentioned in the introduction in an economical manner.

This and other objects and advantages are achieved in accordance with the invention by a rail vehicle that comprises a bogie, a bogie cavity into which the bogie is embedded and a bogie cladding via which the bogie is at least partially clad, where the bogie cladding has an opening. In addition, the bogie cladding has a flow-inhibitor arranged at the opening to reduce an inflow of air through the opening into the bogie cavity.

The flow-inhibitor inhibits the inflow of air through the opening into the bogie cavity, in particular because the flow-inhibitor increases a flow resistance for the air. Depending on the specific embodiment and/or arrangement of the flow-inhibitor, the flow-inhibitor may even completely prevent the inflow of air through the opening into the bogie cavity. In other words, the flow-inhibitor can have a sealing effect.

A reduction in the air resistance of the rail vehicle can be achieved with the aid of the flow-inhibitor. In addition, unlike the conventional air-blowing device of DE 10 2016 201 154 A1, the flow-inhibitor does not require any external energy supply to fulfill its function. Consequently, a reduction in the energy requirement of the rail vehicle in drive mode can be achieved with the aid of the flow-inhibitor.

The flow-inhibitor can also have a positive influence on the speed distribution of an outside air flow in the underframe region of the rail vehicle, particularly such that the amount of flying ballast is reduced or prevented. In addition, with the aid of the flow-inhibitor the ingress of ballast, dirt and/or snow particles into the bogie cavity can be reduced or prevented, such that the maintenance costs of the rail vehicle can be reduced.

Here, a bogie cavity here is to be understood as a hollow space for the bogie, in which the bogie is at least partially accommodated.

Here, a bogie cladding is to be understood as cladding (in the sense of an envelope) for the bogie. A cladding element of the bogie cladding need not necessarily be attached to the bogie itself or to the bogie frame thereof. For example, a cladding element of the bogie cladding can be attached to the body of the rail vehicle, in particular in the underframe area of the rail vehicle. The purpose of a cladding element of the bogie cladding is preferably to at least partially close off the bogie cavity. An opening of the bogie cladding in the sense of the present invention may in particular be a gap.

Here, a reduction in the inflow of air through the opening of the bogie cladding into the bogie cavity is understood to mean a reduction in the air mass flow flowing through the opening into the bogie cavity (i.e., the air mass that flows through the opening into the bogie cavity per unit of time).

In principle, the flow-inhibitor can be formed as a rigid element.

The flow-inhibitor is advantageously elastically deformable. This makes it possible for the flow-inhibitor to reassume its original shape after being deformed. An advantage that arises when the flow-inhibitor is formed to be elastically deformable is that the flow-inhibitor can be deformed, for example, during the assembly of the bogie cladding and/or adjacent components, without the flow-inhibitor being damaged. An elastic deformability of the flow-inhibitor also enables the flow-inhibitor to adjust adaptively to the structural or geometrical circumstances in the region of the opening, as a result of which, for example, at least part of the opening can be effectively closed and thus an effective inhibition of the inflow of air through the opening can be achieved.

If the opening is located between two cladding elements that should be movable relative to one another, then the movability of these elements can be ensured by an elastic deformability of the flow-inhibitor and at the same time the inflow of air through the opening can be effectively reduced.

In a preferred embodiment of the invention, the flow-inhibitor is formed as a sealing lip. A sealing lip can be produced inexpensively and enables the inflow of air through the opening to be effectively inhibited.

The flow-inhibitor or the sealing lip may in particular contain an elastomer or consist of an elastomer. In this way, a high elasticity of the flow-inhibitor can be achieved.

In another preferred embodiment of the invention, the flow-inhibitor is embodied as a brush. A brush is likewise inexpensive to manufacture and enables the inflow of air through the opening to be effectively inhibited.

In the case of the embodiment of the flow-inhibitor as a brush, the flow-inhibitor expediently has an elastically deformable brush trim, in particular a brush trim made of metal, ceramic, plastic and/or hair.

The flow-inhibitor is preferably attached to a cladding element of the bogie cladding, for example, via screw, rivet and/or adhesive connection.

The bogie cladding may have a first cladding element and a second cladding element arranged adjacent to the first cladding element. The opening can, for example, be a gap between the first and the second cladding element. In other words, with the aid of the flow-inhibitor the inflow of air through the gap between adjacent cladding elements of the bogie cladding can in particular be reduced or prevented.

The first and the second cladding elements can, for example, be attached to the bogie, in particular to the bogie frame thereof. In other words, the first and the second cladding elements can be cladding elements on the bogie side. Here, the first and the second cladding elements can preferably move together with the bogie relative to the body of the rail vehicle, in particular without changing their position relative to the bogie frame. The opening may in this case be, for example, an assembly gap between the two cladding elements.

Alternatively, the first and the second cladding elements can be attached to the body of the rail vehicle. In other words, the first and the second cladding elements can be cladding elements on the body side. Here, the first and second cladding elements are preferably immovable relative to the body. The opening may in this case, for example, be an assembly gap between the two cladding elements in this case.

It is further possible for the first cladding element to be attached to the bogie and for the second cladding element to be attached to the body. This means that the first cladding element may be a cladding element on the bogie side and the second cladding element may be a cladding element on the body side. Here, the first cladding element can preferably move together with the bogie relative to the body, in particular without changing its position relative to the bogie frame, while the second cladding element is preferably immovable relative to the body. In this case, the opening may in particular be a movement gap between the two cladding elements. Conversely, it is possible for the first cladding element to be attached to the body and for the second cladding element to be attached to the bogie.

Furthermore, the rail vehicle can have a further flow-inhibitor arranged at the opening to reduce an inflow of air through the opening into the bogie cavity. This allows the inflow of air through the opening into the bogie cavity to be further reduced. The first-mentioned flow-inhibitor and the further flow-inhibitor are preferably arranged one above the other or next to one another.

The first-mentioned flow-inhibitor can be, for example, attached to the first cladding element. The further flow-inhibitor can be, for example, attached to the second cladding element. The further flow-inhibitor is preferably formed as a sealing lip or as a brush.

In an advantageous embodiment of the invention, the two flow-inhibitors are spaced apart from one another. In another advantageous embodiment of the invention, the two flow-inhibitors are in contact with one another and/or the two flow-inhibitors engage in one another.

Furthermore, it can be provided that the first-mentioned flow-inhibitor is in contact with the second cladding element and/or the further flow-inhibitor is in contact with the first cladding element. Alternatively, it is possible for the first-mentioned flow-inhibitor to be spaced apart from the second cladding element and/or for the further flow-inhibitor to be spaced apart from the first cladding element.

In addition to the aforementioned first cladding element and the aforementioned second cladding element, the bogie cladding can have one or more further cladding elements. The bogie cladding can have an opening (for example, in the form of a gap) between such a further cladding element and the first or second cladding element, and if appropriate a flow-inhibitor of the type described above can be arranged at this opening. Furthermore, the bogie cladding between two such further cladding elements can have an opening (for example, in the form of a gap) and if appropriate can have a flow-inhibitor of the above-described type that is arranged at this opening.

In a further advantageous embodiment, the opening is an opening of a cladding element of the bogie cladding, through which an element of the bogie is guided. The element of the bogie, which is guided through the opening, can be, among other things, a wheelset bearing, a line, in particular a fluid line or an electrical line, or a bracket, such as a bracket for a sand spreader, for example, for a flange lubricating device or for a rail clearer. Furthermore, the flow-inhibitor may be in contact with the element of the bogie or be spaced apart from the element.

Furthermore, the bogie cladding can have at least one further opening. Advantageously, the bogie cladding for the respective further opening at least comprises a separate flow-inhibitor, which is arranged at the further opening to reduce an inflow of air through the further opening into the bogie cavity.

The rail vehicle is expediently fitted with a plurality of bogies, which are respectively embedded in a bogie cavity of the rail vehicle. The rail vehicle can have a bogie cladding of the above-described type in each case for several, in particular all, the bogies.

The description given so far of advantageous embodiments of the invention contains numerous features, which are reproduced in the individual dependent claims, in part consolidated together. However, these features can also be considered individually and combined into other useful combinations. In particular these features can be combined individually and in any suitable combination with the inventive rail vehicle.

Even though some terms are used in the singular or in combination with a numeral in the description or in the claims in each case, the scope of the invention for these terms should not be restricted to the singular or the respective numeral.

The above-described properties, features and advantages of the invention and the manner in which they are achieved will become clearer and more clearly understandable in connection with the following description of the exemplary embodiments of the invention which are explained in more detail in connection with the figures. The exemplary embodiments serve to explain the invention and do not limit the invention to the combinations of features specified therein, not even with regard to functional features. In addition, suitable features of each exemplary embodiment can also be considered in an explicitly isolated manner, removed from one exemplary embodiment, introduced into another exemplary embodiment to complement it, and combined with any of the claims.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

If the same reference characters are used in different figures, they designate the same or corresponding elements, in which:

FIG. 1 shows a part of a rail vehicle which has a bogie and a bogie cladding, in a side view in accordance with the invention;

FIG. 2 shows the bogie and the bogie cladding of the rail vehicle of FIG. 1 in a view from above;

FIGS. 3-6 show two adjacent cladding elements of the bogie cladding, an opening between the two cladding elements and one or two flow-inhibitors arranged at the opening in accordance with an alternative embodiment;

DETAILED DESCRIPTION OF THE EXEMPLARY EMBODIMENTS

Figure 7:
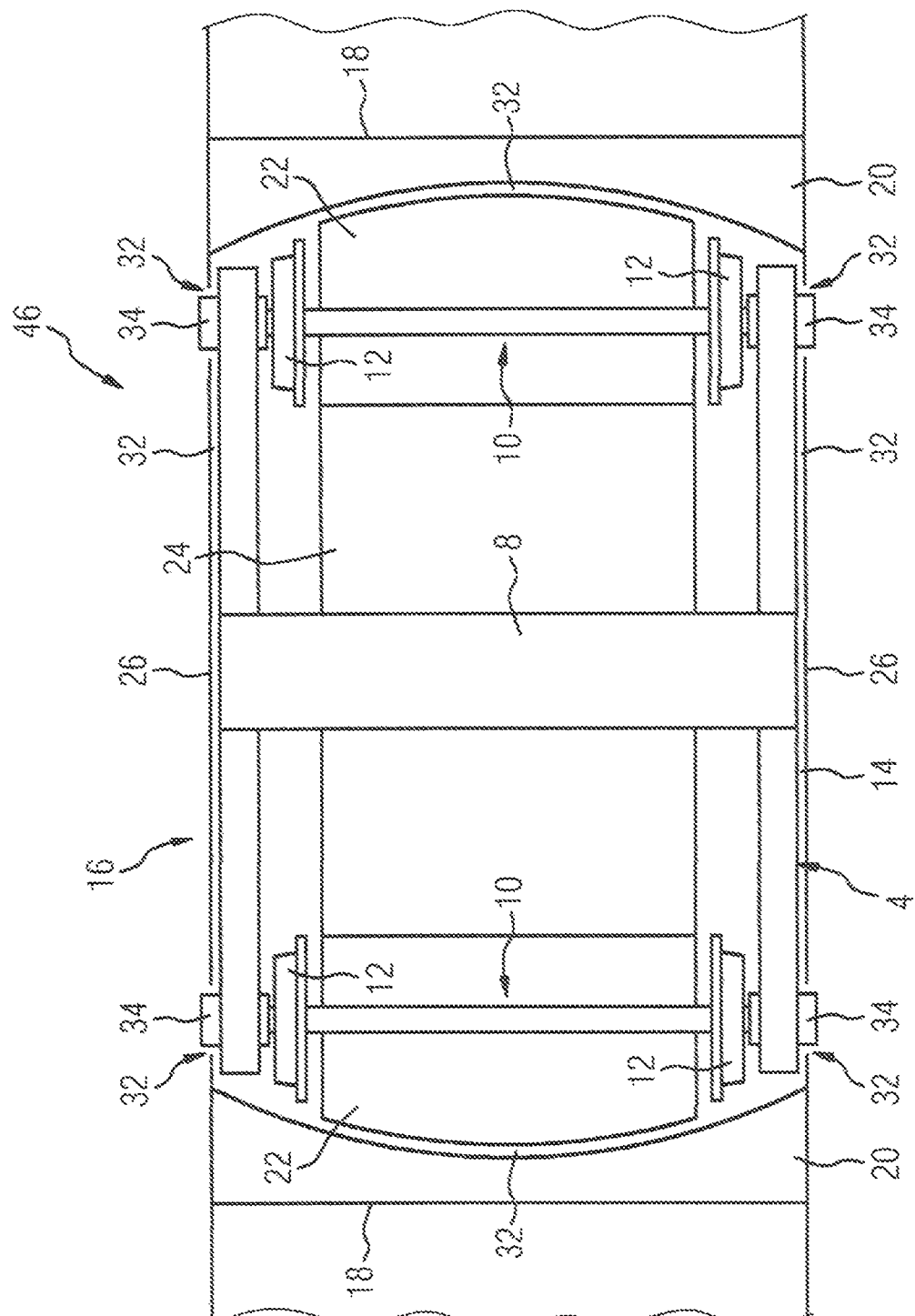
FIG. 7 shows a bogie and a bogie cladding of a further rail vehicle in a view from above in accordance with an embodiment of the invention.

FIG. 1 schematically shows a part of a rail vehicle 2 in a side view.

FIG. 1 shows a bogie 4 of the rail vehicle 2 and a part of a body 6 of the rail vehicle 2. The body 6 of the rail vehicle 2 is mounted on the bogie 4 via a rotary pan of the bogie 4 (not shown in the figure), such that the body 6 can be rotated relative to the bogie 4.

The bogie 4 comprises a bogie frame 8 and two wheelsets 10 among other things (see FIG. 2). FIG. 1 shows two wheels 12 of the two wheelsets 10. Furthermore, the bogie 4 is embedded into a bogie cavity 14 of the rail vehicle 2.

Furthermore, the rail vehicle 2 has a multi-part bogie cladding 16, via which the bogie 4 is clad. The bogie cladding 16 closes off the bogie cavity 14.

The bogie cladding 16 comprises two bulkheads 18 attached to the body 6 and two base walls 20 attached to the body 6. In addition, the bogie cladding 16 comprises two wheelset claddings 22 and a center cladding 24 arranged between the two wheelset claddings 22, where the two wheelset claddings 22 and the center cladding 24 are attached to the bogie 4, in particular to the bogie frame 8. In addition, the bogie cladding 16 comprises two side claddings 26 (not shown in FIG. 1) attached to the body 6 (see FIG. 2). The aforementioned parts 18-26 of the bogie cladding 16 can each consist of one element or a plurality of interconnected elements, in particular a plurality of interconnected plates.

The bogie cavity 14 is delimited upward by a base section 28 of the body 6. In the vehicle longitudinal direction 30, the bogie cavity 14 is delimited by the two bulkheads 18.

The bogie cladding 16 has an opening 32 between its front base wall 20 and its front wheelset cladding 22, in relation to the vehicle longitudinal direction 30. Similarly, the bogie cladding 16 has an opening 32 between its rear base wall 20 and its rear wheelset cladding 22, in relation to the vehicle longitudinal direction 30. These two openings 32 are both a movement gap that allows a relative movement between the respective base wall 20 and the respective wheelset cladding 22.

FIG. 2 shows schematically the bogie 4 and the bogie cladding 16 of the rail vehicle 2 from FIG. 1 in a view from above.

FIG. 2 shows both wheelsets 10 of the bogie 4 with their wheelset bearings 34 and wheels 12. In addition, the two previously mentioned side claddings 26 of the bogie cladding 16 are shown in FIG. 2.

The bogie cladding 16 further has an opening 32 in each case between the parts 22, 24 of the bogie cladding 16 attached to the bogie 4 and the side cladding 26 arranged on the left-hand side of the vehicle and between the parts 22, 24 of the bogie cladding 16 attached to the bogie 4 and the side cladding 26 arranged on the right-hand side of the vehicle. These openings 32 too are in each case a movement gap that allows a relative movement between the respective side cladding 26 and the parts 22, 24 of the bogie cladding 16 attached to the bogie 4.

At the aforementioned openings 32, the bogie cladding 16 is in each case fitted with at least one elastically deformable flow-inhibitor, which serves to reduce an inflow of outside air through the respective opening 32 into the bogie cavity 14 (cf. FIG. 3-FIG. 6). The flow-inhibitors are not shown in FIG. 1 and FIG. 2 for purposes of clarity.

FIGS. 3-6 each schematically show a first cladding element 36a of the bogie cladding 16 and a second cladding element 36b of the bogie cladding 16 arranged adjacent to the first cladding element 36a.

Between the two cladding elements 36a, 36b the bogie cladding 16 has an opening 32, in particular in the form of a gap.

The two cladding elements 36a, 36b can be attached to the bogie 4. Alternatively, the two cladding elements 36a, 36b can be attached to the body 6. Further alternatively, the first cladding element 36a can be attached to the bogie 4, while the second cladding element 36b is attached to the body 6, or vice versa. For example, the first cladding element 36a can be one of the two base walls 20 of the bogie cladding 16 or an element of the respective base wall 20. The second cladding element 36 can be, for example, one of the two wheelset claddings 22 of the bogie cladding 16 or an element of the respective wheelset cladding 22.

In the embodiment of FIG. 3, the bogie cladding 16 has a flow-inhibitor 38 arranged at the opening 32, which is attached to the first cladding element 36a. This flow-inhibitor 38 is formed as a brush, where the flow-inhibitor 38 has a brush trim consisting of a plurality of brush fibers 40.

The flow-inhibitor 38 extends in the embodiment of FIG. 3 only over part of the width 42 of the opening 32. This means that the flow-inhibitor 38 is spaced apart from the second cladding element 36b. With the aid of the flow-inhibitor 38, it becomes possible to ensure that a smaller part of an outside air flow 44 flows through the opening 32 into the bogie cavity 14 (compared to the case in which no such flow-inhibitor 38 is arranged at the opening 32).

In the embodiment of FIG. 4, the bogie cladding 16 comprises a first flow-inhibitor 38a arranged at the opening 32, which is attached to the first cladding element 36a, and a second flow-inhibitor 38b arranged at the opening 32, which is attached to the second cladding element 36b. The respective flow-inhibitors 38a, 38b are formed as a brush and have a brush trim consisting of a plurality of brush fibers 40.

In the embodiment of FIG. 4, the two flow-inhibitors 38a, 38b only extend over part of the width 42 of the opening 32. This means that the first flow-inhibitor 38a is spaced apart from the second cladding element 36b and the second flow-inhibitor 38b is spaced apart from the first cladding element 36a. In the embodiment of FIG. 4, the two flow-inhibitors 38a, 38b touch and engage in one another.

In the embodiment of FIG. 5, the bogie cladding 16 comprises a first flow-inhibitor 38a arranged at the opening 32, which is attached to the first cladding element 36a, and a second flow-inhibitor 38b arranged at the opening 32, which is attached to the second cladding element 36b. These two flow-inhibitors 38a, 38b are each formed as a brush and each have a brush trim consisting of a plurality of brush fibers 40.

In addition, the two flow-inhibitors 38a, 38b in the embodiment of FIG. 5 extend over the entire width 42 of the opening 32. This means that the first flow-inhibitor 38a is in contact with the second cladding element 36b and the second flow-inhibitor 38b is in contact with the first cladding element 36a. In the embodiment of FIG. 5, the two flow-inhibitors 38a, 38b are spaced apart from one another.

In the embodiment of FIG. 6, the bogie cladding 16 has a flow-inhibitor 38 arranged at the opening 32, which is attached to the first cladding element 36a. This flow-inhibitor 38 is formed as a sealing lip and is in contact with the second cladding element 36b.

In each of the embodiment of FIG. 3 to FIG. 6, the respective flow-inhibitors 38, 38a, 38b inhibit an inflow of air through the opening 32 into the bogie cavity 14.

At least one of the two bulkheads 18 of the bogie cladding 16 (cf. FIG. 1 or FIG. 2) can have an opening through which, for example, a cable and/or a fluid line are/is guided. At such an opening, the bogie cladding 16 may likewise have a flow-inhibitor of the above-described type to reduce an inflow of air into the bogie cavity 14 through this opening.

FIG. 7 shows schematically a bogie 4 and a bogie cladding 16 of a further rail vehicle 46 in a view from above.

The description of the following exemplary embodiment is primarily limited to the differences from the exemplary embodiments of FIG. 1 and FIG. 2, to which reference is made with regard to the same features and functions.

In the bogie cladding 16 from FIG. 7, both side claddings 26 each have two openings 32. One of the wheelset bearings 34 is in each case guided through these openings 32. In other words, one of the wheelset bearings 34 of the bogie 16 protrudes out of the openings 32 in each case.

Figure 8:
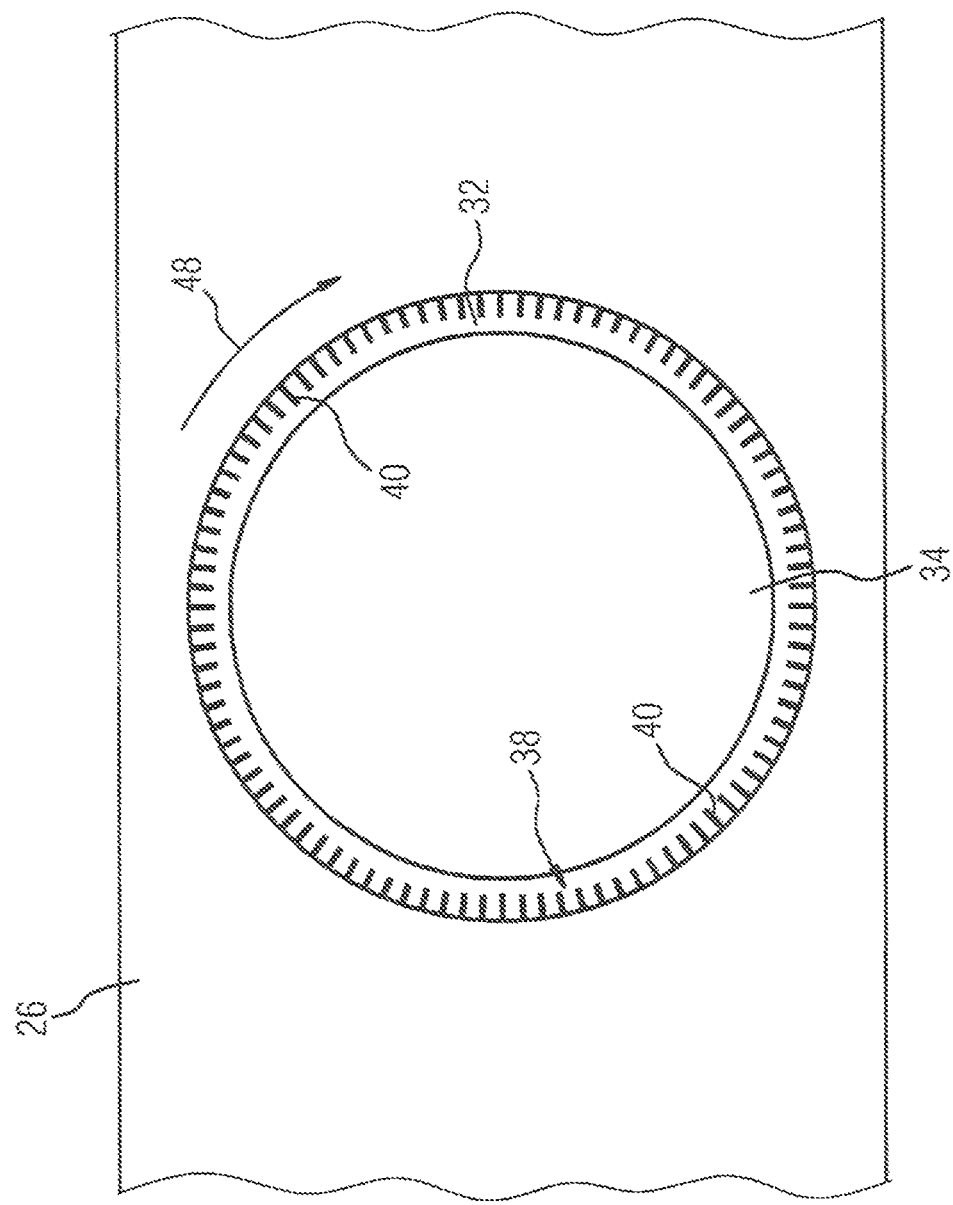
FIG. 8 shows a part of the bogie cladding of FIG. 7, a wheelset bearing guided through an opening of the bogie cladding and a flow-inhibitor arranged at the opening.

At these openings 32, the bogie cladding 16 is in each case also fitted with an elastically deformable flow-inhibitor that serves to reduce an inflow of outside air through the respective opening 32 into the bogie cavity 14 (cf. FIG. 8).

FIG. 8 shows an exemplary section of one of the side claddings 26 of the bogie cladding 16 from FIG. 7. One of the openings 32 of the side cladding 26, from which one of the wheelset bearings 34 protrudes, is located in the section of the side claddings 26 that is depicted.

The bogie cladding 16 has a flow-inhibitor 38 arranged at the opening 32, which is formed as a brush and comprises a plurality of brush fibers 40. This flow-inhibitor 38 surrounds the wheelset bearing 34 protruding from the opening 32 in the circumferential direction 48 thereof.

In the present example, the brush fibers 40 of the flow-inhibitor 38 are spaced apart from the wheelset bearing 34. Alternatively the brush fibers 40 can touch the wheelset bearing 34.

Although the invention has been illustrated and described in detail by the preferred exemplary embodiments, the invention is not restricted by the disclosed examples and other variations can be derived therefrom without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rail vehicle, comprising:
   a bogie;
   a bogie cavity into which the bogie is embedded; and
   a bogie cladding via which the bogie is at least partially clad, the bogie cladding including an opening;
   wherein the bogie cladding includes a planar flow inhibitor arranged at the opening and extends across a width of the rail vehicle and is oriented along a longitudinal direction of the bogie cladding or surrounds a wheelset bearing protruding from the opening in the circumferential direction thereof to reduce an inflow of air through the opening into the bogie cavity.

2. The rail vehicle as claimed in claim 1, wherein the flow-inhibitor is elastically deformable.

3. The rail vehicle as claimed in claim 2, wherein the flow-inhibitor is formed as a brush.

4. The rail vehicle as claimed in claim 2, wherein the opening is an opening of a cladding element of the bogie cladding through which an element of the bogie is guided.

5. The rail vehicle as claimed in claim 1, wherein the flow-inhibitor is formed as a brush.

6. The rail vehicle as claimed in claim 5, wherein the opening is an opening of a cladding element of the bogie cladding through which an element of the bogie is guided.

7. The rail vehicle as claimed in claim 1, wherein the flow-inhibitor is formed as a sealing lip.

8. The rail vehicle as claimed in claim 7, wherein the opening is an opening of a cladding element of the bogie cladding through which an element of the bogie is guided.

9. The rail vehicle as claimed in claim 1, wherein the bogie cladding includes a first cladding element and a second cladding element arranged adjacent to the first cladding element; and wherein said opening is a gap between the first and the second cladding element.

10. The rail vehicle as claimed in claim 9, wherein the first and the second cladding elements are attached to the bogie.

11. The rail vehicle as claimed in claim 10, further comprising:

a further flow-inhibitor arranged at the opening to reduce an inflow of air through the opening into the bogie cavity;
wherein the flow-inhibitor is attached to the first cladding element and the further flow-inhibitor is attached to the second cladding element.

12. The rail vehicle as claimed in claim 11, wherein at least one of (i) the flow-inhibitor is in contact with the second cladding element and (ii) the further flow-inhibitor is in contact with the first cladding element.

13. The rail vehicle as claimed in claim 9, further comprising:
a body;
wherein the first and the second cladding element are attached to the body.

14. The rail vehicle as claimed in claim 13, further comprising:
a further flow-inhibitor arranged at the opening to reduce an inflow of air through the opening into the bogie cavity;
wherein the flow-inhibitor is attached to the first cladding element and the further flow-inhibitor is attached to the second cladding element.

15. The rail vehicle as claimed in claim 14, wherein at least one of (i) the flow-inhibitor is in contact with the second cladding element and (ii) the further flow-inhibitor is in contact with the first cladding element.

16. The rail vehicle as claimed in claim 9, further comprising:
a further flow-inhibitor arranged at the opening to reduce an inflow of air through the opening into the bogie cavity;
wherein the flow-inhibitor is attached to the first cladding element and the further flow-inhibitor is attached to the second cladding element.

17. The rail vehicle as claimed in claim 16, wherein the flow-inhibitor are spaced apart from one another.

18. The rail vehicle as claimed in claim 16, wherein the flow-inhibitor are at least one of (i) in contact with one another and (ii) engage in one another.

19. The rail vehicle as claimed in claim 16, wherein at least one of (i) the flow-inhibitor is in contact with the second cladding element and (ii) the further flow-inhibitor is in contact with the first cladding element.

20. The rail vehicle as claimed in claim 1, wherein the opening is an opening of a cladding element of the bogie cladding through which an element of the bogie is guided.

21. The rail vehicle as claimed in claim 9, further comprising:
a body;
wherein one of:
(i) the first cladding element is attached to the bogie and the second cladding element is attached to the body and
(ii) the first cladding element is attached to the body and the second cladding element is attached to the bogie.

22. The rail vehicle as claimed in claim 21, further comprising:
a further flow-inhibitor arranged at the opening to reduce an inflow of air through the opening into the bogie cavity;
wherein the flow-inhibitor is attached to the first cladding element and the further flow-inhibitor is attached to the second cladding element.

\* \* \* \* \*